United States Patent
Leighton et al.

(10) Patent No.: US 11,119,316 B2
(45) Date of Patent: Sep. 14, 2021

(54) WAVEGUIDE FOR HEAD-UP DISPLAY, INCLUDING REFLECTIVE OUTPUT COUPLING STRUCTURE

(71) Applicant: BAE SYSTEMS plc, London (GB)

(72) Inventors: James Raymond Leighton, Rochester (GB); Michael David Simmonds, Rochester (GB); Rory Thomas Alexander Mills, Rochester (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 16/302,004

(22) PCT Filed: Apr. 10, 2017

(86) PCT No.: PCT/GB2017/050993
§ 371 (c)(1),
(2) Date: Nov. 15, 2018

(87) PCT Pub. No.: WO2017/203201
PCT Pub. Date: Nov. 30, 2017

(65) Prior Publication Data
US 2019/0162963 A1 May 30, 2019

(30) Foreign Application Priority Data
May 23, 2016 (GB) .................................... 1609027

(51) Int. Cl.
*G02B 27/01* (2006.01)
*G02B 27/00* (2006.01)
*F21V 8/00* (2006.01)

(52) U.S. Cl.
CPC ....... *G02B 27/0101* (2013.01); *G02B 6/0025* (2013.01); *G02B 6/0036* (2013.01);
(Continued)

(58) Field of Classification Search
CPC .................................................. G02B 27/0081
See application file for complete search history.

(56) References Cited

U.S. PATENT DOCUMENTS

| 3,883,221 | A | 5/1975 | Rigrod |
| 5,832,165 | A | 11/1998 | Reichert et al. |

(Continued)

FOREIGN PATENT DOCUMENTS

| CN | 103837937 A | 6/2014 |
| JP | S6097309 A | 5/1985 |

(Continued)

OTHER PUBLICATIONS

International Preliminary Report on Patentability received for PCT Application No. PCT/GB2017/050993, dated Dec. 6, 2018. 9 pages.

(Continued)

*Primary Examiner* — Chris H Chu
(74) *Attorney, Agent, or Firm* — Finch & Maloney PLLC

(57) ABSTRACT

A waveguide structure for a head up display in which a reflective output coupling structure is formed of a separate, but connected, component to a main waveguide. Light is coupled from the main waveguide to the output coupling structure by evanescent wave coupling. In a method of manufacture for such a waveguide the output coupling structure is attached to the main waveguide using an optical feedback technique.

20 Claims, 3 Drawing Sheets

(52) U.S. Cl.
 CPC ......... *G02B 6/0055* (2013.01); *G02B 6/0065* (2013.01); *G02B 27/0081* (2013.01); *G02B 27/0172* (2013.01); *G02B 2027/011* (2013.01); *G02B 2027/0125* (2013.01)

(56) References Cited

U.S. PATENT DOCUMENTS

| | | | |
|---|---|---|---|
| 8,830,588 B1* | 9/2014 | Brown | G02B 27/0172 359/630 |
| 9,677,721 B2* | 6/2017 | George | F21S 43/245 |
| 2002/0001431 A1* | 1/2002 | Yonekubo | G02B 6/3522 385/32 |
| 2002/0048429 A1* | 4/2002 | Zhao | G02B 6/29355 385/30 |
| 2003/0076594 A1* | 4/2003 | Kramer | G02B 5/1866 359/569 |
| 2005/0201683 A1* | 9/2005 | Ghiron | G02B 6/4204 385/39 |
| 2006/0228073 A1* | 10/2006 | Mukawa | G02B 17/0856 385/31 |
| 2009/0245730 A1 | 10/2009 | Kleemann | |
| 2010/0027289 A1* | 2/2010 | Aiki | G02B 6/0011 362/558 |
| 2012/0301074 A1 | 11/2012 | Spitzer | |
| 2013/0286454 A1* | 10/2013 | Toyoda | H01S 5/141 359/199.1 |
| 2015/0063751 A1* | 3/2015 | Tremblay | G02B 6/0013 385/33 |

FOREIGN PATENT DOCUMENTS

| | | |
|---|---|---|
| WO | 2005024469 A2 | 3/2005 |
| WO | 2017203201 A1 | 11/2017 |

OTHER PUBLICATIONS

International Search Report and Written Opinion received for PCT Application No. PCT/GB2017/050993, dated Jun. 30, 2017. 14 pages.

Search Report under Section 17(5) received for GB Application No. GB 1609027.6, dated Nov. 11, 2016. 6 pages.

* cited by examiner

WAVEGUIDE FOR HEAD-UP DISPLAY, INCLUDING REFLECTIVE OUTPUT COUPLING STRUCTURE

This disclosure relates to manufacturing techniques for optical waveguides and is particularly, but not exclusively, relevant to the manufacture of waveguides for head up displays.

Head up displays utilise a transparent component, which the user looks through, to overlay an image on the user's actual view of the surroundings. The user's eye receives light from those surroundings in the normal way, and the user's eye also receives light from the head up display system and can thus view both images at once.

The transparent component of a head up display may be either mounted in a fixed position on equipment being used by a user (for example the cockpit of an aircraft), or on the head of the user (for example as a pair of spectacles, or on a helmet) such that the component moves with the user's head and thus remains at a fixed location in relation to the user's eye.

A fundamental requirement of a head up display is to couple light from an image source to the location required for viewing by the user. This is typically accomplished utilised a waveguide system as shown in cross section in FIG. 1.

Waveguide 10 is formed from an optically transmissive material which propagates light at the required wavelengths. Image light (shown as an example ray, 13) from a projector (mounted, for example in the cockpit or helmet, out of the line-of-sight of the user) is injected into a first end 11 of the waveguide using a coupling device 12, for example a prism. Ray 13 then propagates along the length of the waveguide, guided by total internal reflection at the surfaces of the waveguide. The waveguide surfaces may be plain or may be coated to improve performance. At the required location an output coupling structure 14 is provided to redirect the light out of the waveguide 10 towards the user's eye 15. FIG. 1 is not drawn to scale and the output coupling structure is shown greatly enlarged to demonstrate its presence and general structure. Reflective coupling structures as shown are typically at a scale of microns. As shown by ray 16, light from the outside world propagates through the waveguide to the user's eye.

The structure of FIG. 1 thus allows the transmission of an image from a projector to a user's eye, without placing any non-transparent components in the user's field of view.

The image presented to the user will be distorted by irregularities (for example non-flat surfaces or non-parallel faces) in the optical waveguide 10 or any other element in the optical chain. As can be seen in FIG. 1 the output coupling structure 14 is formed in the surface of the waveguide typically by stamping or engraving into the surface. Forming the output structure may induce stress and/or irregularities in the waveguide leading to poor optical performance. Such difficulties may increase the cost and time for manufacture.

There is therefore a requirement for a waveguide system to provide an improved image quality.

The embodiments described below are not limited to implementations which solve any or all of the disadvantages of known systems.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided an optical waveguide for a head up display, the waveguide comprising a waveguide body extending from an input end to an output end, an input coupling device at the input end of the waveguide body for coupling light into the waveguide body, which light propagates along the waveguide body towards the output end by total internal reflection, and an output coupling structure attached to a face of the waveguide body at the output end with an air gap between a region of the output coupling structure and the face of the waveguide body, the air gap being such that light is coupled in that region from the waveguide body to the output coupling structure by evanescent wave coupling, wherein the output coupling structure is a reflective structure configured to direct light out of the optical waveguide by reflection.

The input coupling device may be a prism or a diffractive grating.

The output coupling structure may comprise a saw-tooth grating. The output coupling structure may be a modified saw-tooth grating, graded along the propagation axis of the waveguide body to provide varying reflectivity. The grating may be by varying the size, depth, or spacing of the features of the grating.

The optical waveguide may further comprise an optical coating on the face of the waveguide body in the region of the air gap.

The optical waveguide may further comprise an optical coating on a face of the output coupling structure in the region of the air gap. The optical waveguide may further comprise an optical coating on the exposed face of the output coupling structure.

The output coupling structure may be formed from a transmissive UV curing material. The curing step may comprise exposing the transmissive material to UV light.

The output coupling structure may be attached to the waveguide body by an adhesive.

The air gap may be maintained by a spacer component.

After being reflected by the output coupling structure, and before leaving the waveguide, the light may pass through the waveguide body. The light may pass through the waveguide body substantially perpendicular to the face of the waveguide body to which the output coupling structure is attached.

There is also provided a method of manufacturing a waveguide for a head up display, the method comprising the steps of providing a waveguide body having an input end and an output end, and attaching a reflective output coupling structure to a face of the waveguide body with an air gap between a region of the output coupling structure and the face of the waveguide body, the air gap being such that light is coupled in that region from the waveguide body to the output coupling structure by evanescent wave coupling.

Optical feedback may be utilised to position the output coupling structure during the step of attaching the output coupling structure to the face of the waveguide body.

The method may further comprise the step of applying an optical coating on a face of the waveguide body and/or the output coupling structure in the region of the air gap.

The output coupling structure may be a saw-tooth grating.

The method may further comprise forming the output coupling structure from optically transmissive material.

The techniques described herein attempt to improve the overall final product and also lower the overall manufacturing cost by increasing the yield of useable waveguides created from the process.

BRIEF DESCRIPTION OF THE DRAWINGS

Embodiments of the invention will be described, by way of example, with reference to the following drawings, in which.

DETAILED DESCRIPTION

Figure 1:
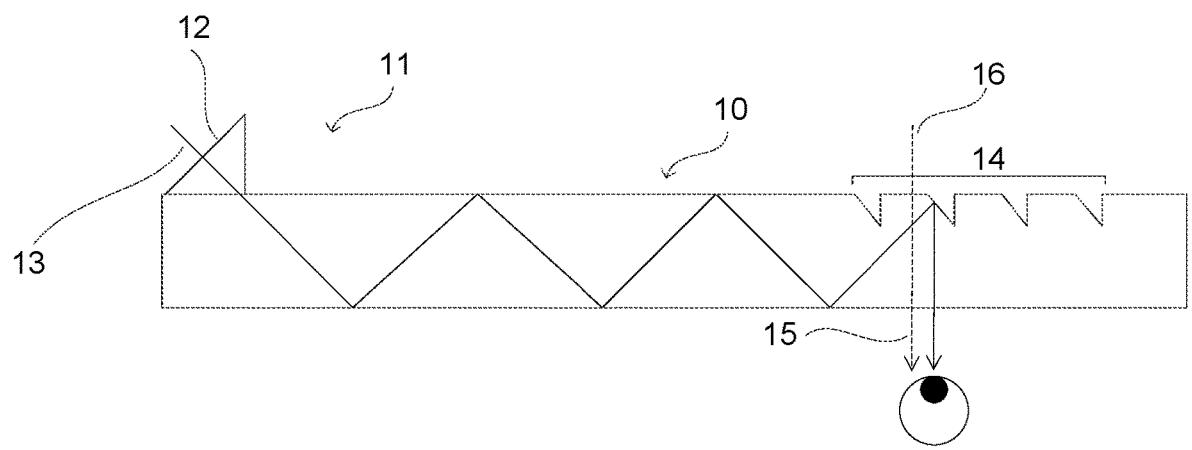
FIG. 1 shows a cross-section waveguide structure.

Further details, aspects and embodiments of the invention will now be described, by way of example only, with reference to the drawings. Elements in the figures are illustrated for simplicity and clarity and have not necessarily been drawn to scale. Like reference numerals have been included in the respective drawings to ease understanding.

Figure 2:
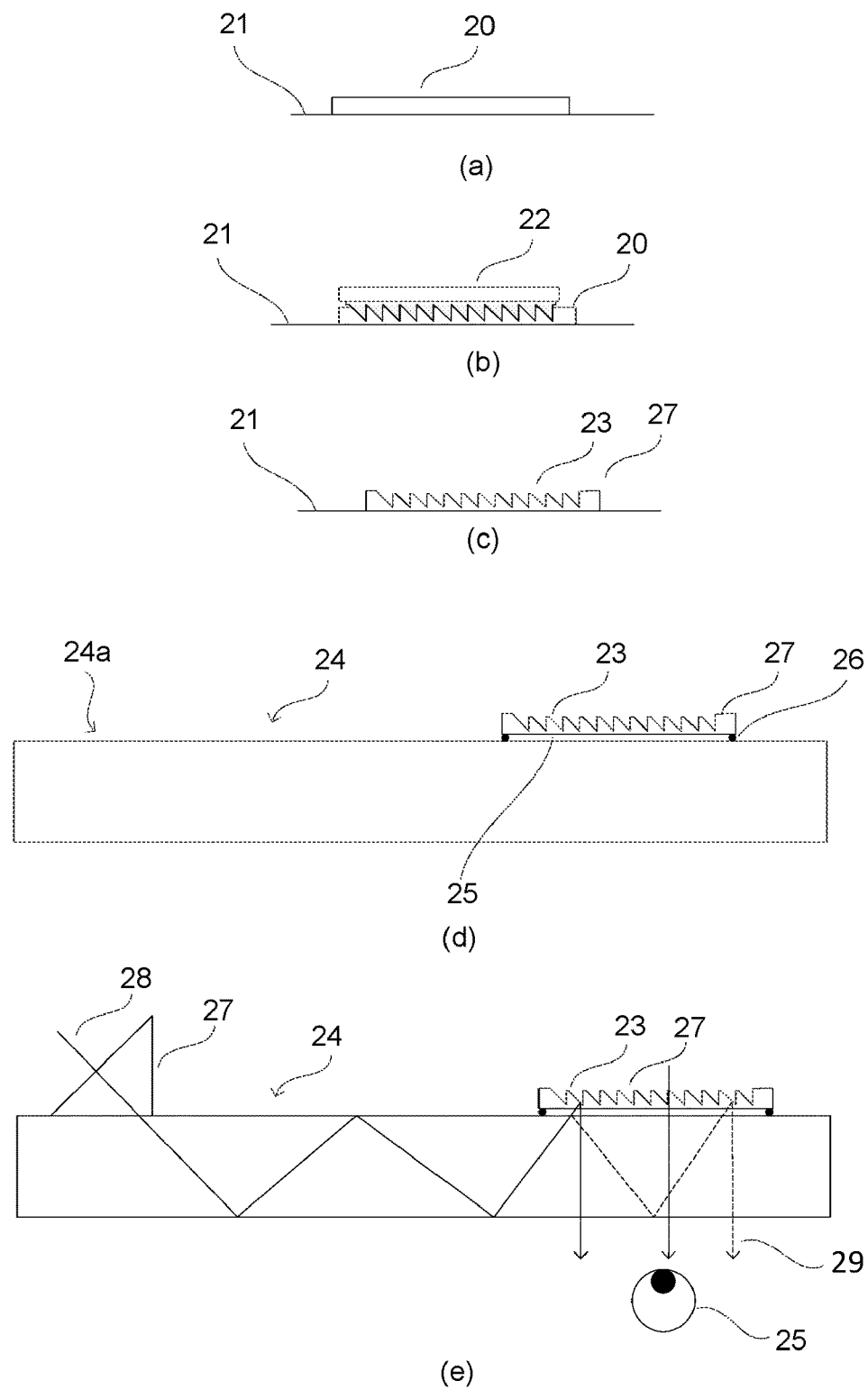
FIG. 2 shows a cross-section of a waveguide structure and manufacturing steps.
Figure 3:
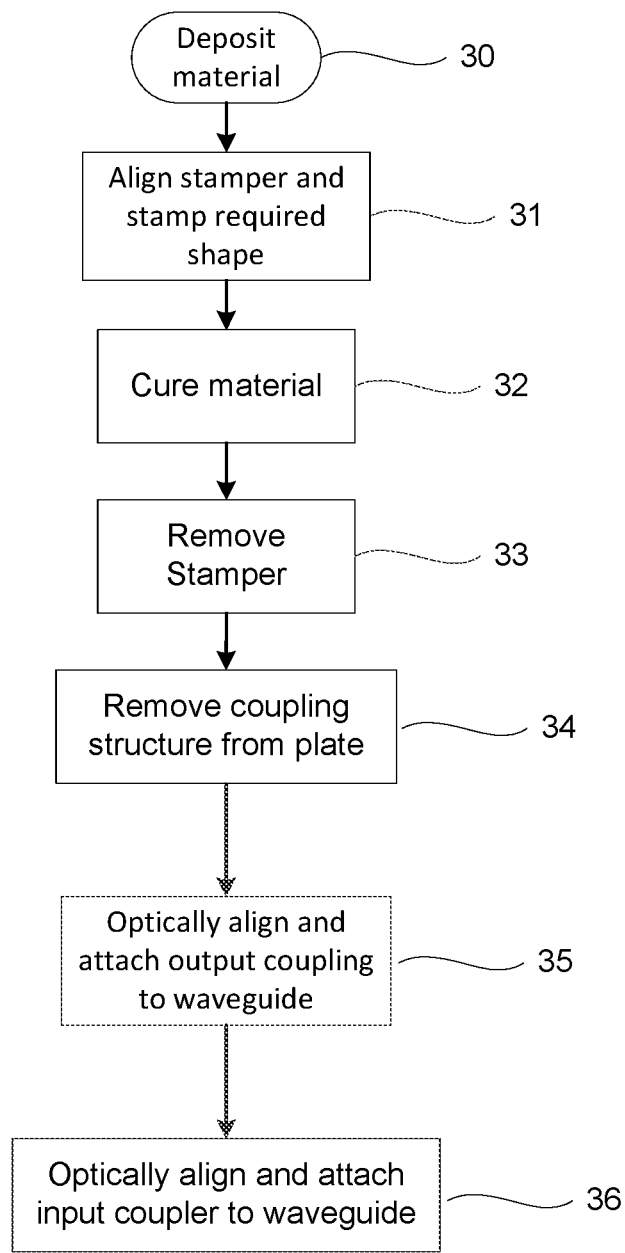
FIG. 3 shows a flow chart of a manufacturing process.

FIG. 2 shows a sequence of manufacturing steps to form a waveguide functionally comparable to that shown in FIG. 1. FIG. 2 shows cross-sections through the waveguide and other components. FIG. 3 shows a flow chart of the manufacturing technique.

In FIG. 2(a) (Step 30) a layer of optically transmissive material 20 is deposited on a plate 21. The optically transmissive material may be a curable polymer or adhesive which remains liquid or gel-like until cured. Any material which performs as required by the process described below, and can be formed into the required output coupling structure, may be utilised. The plate 21 is utilised to provide support for the material during the production process but does not form a part of the optical component being manufactured.

In FIG. 2(b) a stamper tool 22 is brought into contact (Step 31) with the material 20 to impress an output coupling grating into that material. The stamper is formed of an appropriate material to impress the required shape into the material 20. The stamper may be the inverse of the final shape required, or may be modified to allow for changes in shape that are known to occur in the material 20 during stamping and curing.

As explained in relation to FIG. 1 the output coupling grating is not shown to scale and is much smaller than suggested by the figures; typically the output coupling grating is on a micron scale. The structure may be, for example, a microstructure comprising a spaced saw tooth grating structure or more complex structures may be utilised to give the required optical performance. The output coupling grating is typically at a micron scale and is small enough that when presented close to a user's eye it does not interfere with normal vision through the device (i.e. with no, or acceptable levels of, visual distortion).

The material 20 is then cured (Step 32) to set the material into the required shape to form the output coupling structure 27. The curing may be performed as appropriate for the material being utilised. For example, a UV curing polymer or adhesive may be exposed to UV light to cure the material. The curing step may be performed while the stamper is in position, or if appropriate for the material being used, after the stamper 22 has been removed.

As shown in FIG. 2(c) once the material has cured and the stamper 22 removed (Step 33) a grating 23 is formed in the cured material. The output coupling structure 27 can be removed from the plate 21 at an appropriate point in the process.

Any method of forming the structure 27 may also be utilised.

The output coupling structure is removed from the plate at step 34 and at Step 35, FIG. 2(d), the output coupling structure 27 is attached in an output region of a waveguide 24. The output coupling structure 23 is oriented such that the grating 23 is orthogonal to a direction of propagation of light from an input end 24a of the waveguide 24. The output coupling structure 27 is spaced from the face of the waveguide 24 such that there is an air gap 25 between the two components. The air gap 25 size is of the order of hundreds of nanometres, which must be accurately maintained. The joining mechanism must therefore be suitably rigid to achieve this. The output coupling structure 27 may be held in place by an adhesive 26, or a spacer may be utilised to achieve the correct gap.

During manufacture active optical feedback may be utilised to achieve the correct position of the output coupling structure. The position can be adjusted by a manual or automated system while an image or other analysis signal is projected through the device. Once the correct optical performance is obtained the adhesive can be applied and/or cured to lock the output coupling structure 27 in position.

FIG. 2(e) shows the device with an input prism 27 added (Step 36) (a prism is shown by way of example only, any input coupler may be utilised for example diffractive elements may be used) and an example ray 28 for reference. Ray 28 is indicative of image light propagating from a microdisplay projector. Ray 28 is not shown to scale and is used for illustration purposes only.

Ray 28 propagates through the waveguide structure in the same manner as explained with reference to FIG. 1. In the region of output coupling structure 27 a portion of the light couples from the waveguide into the output coupling structure 27 due to Frustrated Total Internal Reflection (FTIR). The ray angle at the surface of the waveguide 24 is such that Total Internal Reflection (TIR) would normally occur, but due to the proximity of the output coupling structure the evanescent field of the propagating light overlaps with the material of the output coupling structure which results in evanescent wave coupling from the waveguide 24 into the output coupling structure 27.

The portion of light that is coupled is dependent on a number of parameters relating to the material of the waveguide 24 and output coupling structure 27, including the size of the air gap, any surface coatings, and the wavelength and angle of incidence of the light. Although a number of parameters affect the behaviour, the coupling can be reliably predicted using known optical modelling techniques.

Light which has coupled into the output coupling structure 27 propagates to the back surface and is reflected by the grating 23. The light passes through the air interface (because the angle is above the critical angle) and propagates through the waveguide 24 to the user's eye 25. The structure of FIG. 2(e) will thus transfer an image injected into the waveguide at input 27 to a user's eye 25. The waveguide 24 and output coupling structure 27 are transparent and thus light from the surrounding environment can propagate to the user's eye, and the grating features are of suitable size and shape that they do not interrupt the user's vision.

Light which is not coupled into the output coupling structure continues propagating 29 in the waveguide 24, and a portion of that light is then coupled into the output coupling structure at the next reflection. This repeated partial coupling results in an expansion of the exit pupil in the direction of propagation along the waveguide 24.

The waveguide of FIG. 2(e) thus provides the same function as the waveguide of FIG. 1, but the structure is formed with reduced mechanical processing of the waveguide 20 compared to the device of FIG. 1. The reduction in processing of the waveguide 20 reduces distortions and stresses in that device. This improves the image quality of a final device by reducing irregularities within the waveguide substrate (for example non-parallel or curved surface). Due to the reduced stresses yield is likely to increase, thus reducing manufacturing cost.

The use of FTIR to couple light to the separated grating component also allows greater control of the image shaping characteristics of the device. The faces of the waveguide 24 and output coupling structure 27 bordering the air gap 25 may be coated with any appropriate optical coating to control the evanescent wave coupling into the output coupling structure 27, and continued internal reflection. In addition the thickness of the air gap may be manipulated to control the efficiency of the evanescent wave coupling along the length of the output coupling structure 27. For example a tapered thickness may be used. This allows the light to be distributed across the output coupling structure 27, thus increasing the pupil size for a head up display. Complex multi-layer dielectric coatings may be utilised to interact with the light in defined ways. For example the coating between the output structure 27 and waveguide 24 may be designed to be polarisation dependent.

Other areas of the waveguide 24 and output coupling structure 27 may be coated to improve performance as required. These coatings may be applied on the faces bordering the air gap as well as other coatings, or only one set of coatings may be used in each area. For example, an optical coating may be deposited on the top face of the waveguide 20 to control propagation of light into the output coupling structure 23. For example the coating may allow only a fraction of the light to propagate into the structure 23, and may reflect the remainder. This allows the light to be distributed across the output coupling structure 23, thus increasing the pupil size for a head up display.

Previously diffractive elements may have been required to provide the pupil expansion provided by the current device, but diffractive elements are challenging to produce and may limit the optical bandwidth of the device.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. An optical waveguide for a head up display, the waveguide comprising:
   a waveguide body extending along its length from an input end to an output end and configured to guide light by total internal reflection from the input end to the output end;
   an input coupling device at the input end of the waveguide body for coupling light into the waveguide body; and
   an output coupling structure adhesively attached to a face of the waveguide body at the output end, wherein there is an air gap between the output coupling structure and a portion of the face of the waveguide body, the air gap being such that light is coupled from the air gap to the output coupling structure by evanescent wave coupling, wherein the output coupling structure has a length along the waveguide body that is less than half of the length of the waveguide body and includes a grating configured to direct light at a predetermined direction out of the optical waveguide by reflection, and wherein no grating structure is present on the face of the waveguide body adjacent to an entirety of the air gap.

2. The optical waveguide according to claim 1, wherein the output coupling structure is a microstructure.

3. The optical waveguide according to claim 1, wherein the grating is a saw-tooth grating.

4. The optical waveguide according to claim 1, further comprising an optical coating on the face of the waveguide body in a region of the air gap.

5. The optical waveguide according to claim 1, further comprising an optical coating on a face of the output coupling structure in a region of the air gap.

6. The optical waveguide according to claim 1, wherein the output coupling structure comprises a UV curing material.

7. The optical waveguide according to claim 1, wherein after being reflected by the output coupling structure, and before leaving the waveguide, the light passes through the waveguide body.

8. The optical waveguide according to claim 7, wherein the light passes through the waveguide body substantially perpendicular to the face of the waveguide body to which the output coupling structure is attached.

9. The optical waveguide according to claim 1, further comprising an adhesive, wherein the air gap is defined by a thickness of the adhesive.

10. A method of manufacturing a waveguide for a head up display, the method comprising:
    providing a waveguide body having an input end at one end of length of the waveguide body and an output end at an opposite end of the length of the waveguide body; and
    attaching, via an adhesive, an output coupling structure to a face of the waveguide body with an air gap between the output coupling structure and a portion of the face of the waveguide body, the air gap being such that light is coupled from the waveguide body to the output coupling structure by evanescent wave coupling, wherein the output coupling structure has a length along the waveguide body that is less than half of the length of the waveguide body and includes a grating configured to direct light at a predetermined direction out of the optical waveguide by reflection, and wherein no grating structure is present on the face of the waveguide body adjacent to an entirety of the air gap.

11. The method according to claim 10, wherein attaching the output coupling structure to the face of the waveguide body includes using optical feedback to position the output coupling structure.

12. The method according to claim 10, further comprising applying an optical coating on the face of the waveguide body and/or a face of the output coupling structure in a region of the air gap.

13. The method of manufacturing according to claim 10, wherein the grating is a saw-tooth grating.

14. The method of manufacturing according to claim 10, further comprising forming the output coupling structure from optically transmissive material, and wherein the output coupling structure is a microstructure, such that it does not interrupt the vision of a user of the head up display.

15. An optical waveguide for a head up display, the waveguide comprising:
  a waveguide body extending along its length from an input end to an output end and configured to guide light by total internal reflection from the input end to the output end;
  an input coupling device at the input end of the waveguide body for coupling light into the waveguide body, wherein the input coupling device includes a prism or a diffractive grating; and
  an output coupling structure adhesively attached to a face of the waveguide body at the output end, wherein there is an air gap between the output coupling structure and a portion of the face of the waveguide body, the air gap being such that light is coupled from the region to the output coupling structure by evanescent wave coupling, wherein the output coupling structure has a length along the waveguide body that is less than half of the length of the waveguide body and includes a saw-tooth grating configured to reflect light at a predetermined direction out of the optical waveguide, and wherein no grating structure is present on the waveguide body anywhere on the portion of the face of the waveguide body adjacent to an entirety of the air gap.

16. The optical waveguide according to claim 15, further comprising an optical coating bordering the air gap.

17. The optical waveguide according to claim 15, further comprising an optical coating on an outward face of the output coupling structure.

18. The optical waveguide according to claim 15, wherein the output coupling structure is a microstructure, such that it is small enough that it does not interrupt the vision of a user of the head up display.

19. The optical waveguide according to claim 15, wherein after being reflected by the output coupling structure, and before leaving the waveguide, the light passes through the waveguide body.

20. The optical waveguide according to claim 15, further comprising an adhesive, wherein the air gap is defined by a thickness of the adhesive.

* * * * *